2,785,977

FOOD FLAVOR-ENHANCING MATERIAL AND METHOD OF MAKING SAME

Leo J. Novak, Dayton, Ohio, assignor to The Commonwealth Engineering Company of Ohio, Dayton, Ohio, a corporation of Ohio No Drawing. Application October 18, 1954,
Serial No. 463,051

8 Claims. (Cl. 99—16)

This invention relates to an improvement in the preparation and preservation of food flavor enhancing agents. More particularly it relates to monosodium glutamate crystals protected with a coating of carboxymethyl dextran.

Sodium l-glutamate is widely used, as such or in racemic mixture with sodium d-glutamate, for enhancing the flavor of various foods such as meats, vegetables, soups, fish and the like. Although the sodium glutamate has no particular flavor or color of its own to impart to the foods with which it is mixed, it has the characteristic of enhancing the natural flavor of those foods.

Various problems are encountered in connection with the glutamate which occurs in crystalline form. Thus, the crystals tend to adhere and clump together when the salt is allowed to stand. Also, the crystals tend to undergo a loss in potency on standing.

An object of this invention is to provide an improved glutamate the crystals of which carry a protective coating so that they do not clump together or lose flavor-enhancing potency when stored.

In accordance with the invention, the sodium glutamate crystals are provided with a coating of carboxymethyl dextran.

The carboxymethyl dextran may be obtained by acting on the selected dextran with a carboxymethylating agent in an aqueous alkaline medium, whereby the carboxymethyl group is substituted for one or more hydroxyl groups in the dextran molecule, with production of an ether. Suitable carboxymethylating agents are chloracetic acid, sodium chloracetate or chloracetamide. The reaction thereof with the dextran is carried out in an aqueous solution of a strong alkali metal hydroxide such as sodium, potassium or lithium hydroxide. Preferably, the dextran is treated, in aqueous solution or suspension, with an excess of sodium or potassium chloracetate in the presence of an excess of sodium or potassium hydroxide at a temperature of 50° C. to 100° C. for a time ranging from about ten minutes to two hours. Preferably, also, the molar ratio of sodium chloracetate or potassium chloracetate to dextran is between 2:1 and 12:1, the molar ratio of sodium or potassium hydroxide to dextran is between 5:1 and 15:1, and the molar ratio of the water to dextran is between 70:1 and 120:1. The ethers obtained have a D. S. (degree of substitution or average number of carboxymethyl groups per anhydroglucopyranosidic unit) of about 0.2 to 3.0.

The reaction product is a viscous mass comprising the sodium or potassium salt of the dextran ether, from which the salt may be precipitated by means of a water-miscible alcohol, e. g., methyl, ethyl, propyl, isopropyl or t-butyl or a ketone such as acetone.

The free ether may be recovered from the salt by mixing the latter with water, acidifying to a pH of about 2.0, and precipitating the carboxymethyl dextran from the acid medium by addition of an aliphatic water-miscible alcohol or ketone. Precipitation of the ether at pH 2.0 is not critical, as other acid pH values may be used, but the highest yields of the ether have been obtained by precipitation at pH 2.0.

The dextran reacted with the carboxymethylating agent may be obtained in various ways. It may be biosynthesized from sucrose by microorganisms of the *Leuconostoc mesenteroides* and *L. dextranicum* types, or their enzymes. Microorganisms (or their enzymes) which may be used include those bearing the following NRRL (Northern Regional Research Laboratory) designations: *Leuconostoc mesenteroides* B-512, B-119, B-1146, B-1190, B-742, B-1191, B-1196, B-1208, B-1216, B-1120, B-1144, B-523; *Streptobacterium dextranicum* B-1254 and *Betabacterium vermiforme* B-1139.

The procedure is to inoculate the culture of the microorganism, or the enzyme filtered from the culture into an aqueous sucrose-bearing nutrient medium, incubate the mass until the dextran is produced in maximum yield, and precipitate the dextran from the fermentate by the addition of a water-miscible aliphatic alcohol or ketone to it. The dextran thus obtained is reduced to a fine powder for conversion to the carboxymethyl ether. This "native" dextran normally has a very high molecular weight which has been calculated to be in the millions. It may be converted to the ether at the native high molecular weight or after partial hydrolysis to a product of lower molecular weight. In general, the dextran may have a molecular weight of 5000 to $150 \times 10^6$ determined by light scattering measurements.

The carboxymethyl dextran is preferably used in the form of a powder the particles of which are considerably smaller than the sodium glutamate crystals.

The monosodium glutamate may be formed in one of several ways. For example, it may be produced from sugar beets which, in their natural state, contain glutamine. The beets are processed to produce a raw juice containing the elements necessary in the production of sugar and molasses, the glutamine being present in the raw sugar juice. During the diffusion step, glutamine passes into the raw juice without decomposition. The juice is then usually made alkaline with lime, during which process the glutamine changes to pyrrolidone carboxylic acid which is the internal anhydride of glutamic acid. The equilibrium is such that in any aqueous solution of either glutamic acid or pyrrolidone carboxylic acid, both are present.

The juice forms sugar and molasses in the manner known to the art. Most of the glutamic acid is contained in the molasses as pyrrolidone carboxylic acid. The molasses is de-sugared by the Steffans process, according to which the molasses is diluted with water to about 5% to 6% sugar, and treated with freshly burned or ground lime. The calcium combines with the sugar to form calcium saccharate which is relatively insoluble, and the solution is passed through a filter press which removes a large part of the sugar. The filtrate may then be further treated to obtain monosodium l-glutamate. It is carbonated with lime kiln gases, the calcium carbonate thus formed is removed by settling and filtration, the filtrate is concentrated in evaporators to uniform density, and is hydrolyzed with a 50% aqueous sodium hydroxide solution. The hydrolyzed liquor is cooled and acidified with hydrochloric acid. The acidified liquor is further concentrated under high vacuum in an evaporating system. Inorganic salts, such as potassium and sodium chloride are precipitated and removed by means of centrifugal filters. The filtrate is adjusted to the appropriate pH and the highly acid liquor is cooled by suitable refrigerating means, and then run into crystallizers. After about five days the l-glutamic acid crystals are formed, together with some sodium chloride.

The filtrate is run into thickeners and the solid crystals are removed. The l-glutamic acid crystals are dissolved in sodium hydroxide solution and the resulting liquid decolored with activated carbon. It is re-concentrated in a boiling pan and the monosodium l-glutamate crystals formed in the crystallizer. These crystals are separated in a centrifuge and dried.

The foregoing is the conventional method for producing sodium l-glutamate from a natural source. Various methods of synthesizing the acid are also known, the syntheses usually resulting in a racemic mixture of the l- and d-forms of the acid which can be converted to the sodium salts and which has been used as a flavor-enhancing aid although the salt of the d-form of glutamic acid is apparently devoid of the capacity for bringing out or emphasizing the natural flavors of foodstuffs. It is also possible to produce l-glutamic acid by enzyme action on certain substrates and to convert it to the sodium salt for addition to foods as a flavor-enhancing adjuvant.

The sodium l-glutamate used in the practice of this invention may be the sodium salt of l-glutamic acid obtained from the juice of sugar beets as described above, that present in a racemic mixture, or l-glutamic acid biosynthesized with the aid of enzymes.

The crystals of the sodium glutamate may be provided with a protective coating of carboxymethyl dextran preferably ground to a particle size smaller than the crystals of the salt, for instance to size $1/100$ to $1/50$ the size of the average crystals of the salt, by placing the crystals and the finely divided carboxymethyl dextran in a mixing drum or vat and thoroughly commingling them together, during which operation the small particles of the dextran ether become autogenously adhered to the surface of the glutamate crystals to act as a coating thereon.

The coated crystals have numerous advantages. In the first place, the carboxymethyl dextran and crystals co-act as mutual carriers, one for the other. Secondly, the crystals carrying the carboxymethyl dextran coating do not tend to adhere or cling together, the coating serving to space the crystals from each other so that the product is free-flowing. Moreover, the carboxymethyl dextran coating acts to protect the glutamate crystals, forming a seal thereon which prevents loss of the flavor-enhancing potency thereby over relatively long-periods of time.

In producing the carboxymethyl coating on the crystals there may be used, for example, from 1 pound to ten pounds of the finely powdered dextran ether to each 3000 pounds of the sodium glutamate.

Coloring aids may be incorporated with the carboxymethyl dextran in order to provide the glutamate crystals with a colored coating, as may be desired for esthetic reasons.

As stated, the carboxymethyl dextran may contain an average of 0.2 to 3.0 carboxymethyl groups per anhydroglucopyranosidic unit of the dextran, and may be derived from a dextran of molecular weight 5000 to $150 \times 10^6$, determined by light scattering measurements. However, it may be preferred to use a carboxymethyl ether of a native, high molecular weight microbiologically produced dextran, such as L. m. B–512, containing an average of 2.0 to 3.0, specifically 2.8, carboxymethyl groups per A. G. U.

The carboxymethyl dextran being odorless and tasteless does not impart a taste or flavor of the food, and does not interfere with the flavor-enhancing effect of the glutamate.

The invention may be practiced in the coating of crystals of sodium glutamate obtained in any way and while certain preferred embodiments have been set forth herein, it is to be understood that changes may be made in practicing the invention without departing from the spirit and scope thereof as defined in the appended claims.

What is claimed is:

1. As a new product, crystals of monosodium glutamate coated with a carboxymethyl ether of a dextran having a molecular weight between 5000 and that of native, microbiologically produced dextran.

2. As a new product, crystals of monosodium glutamate coated with a carboxymethyl ether of a native, high molecular weight, microbiologically produced dextran containing an average of 2.0 to 3.0 carboxymethyl groups per anhydroglucopyranosidic unit.

3. As a new product, crystals of monosodium glutamate coated with a powdered carboxymethyl ether of a dextran having a molecular weight between 5000 and that of native microbiologically produced dextran and the individual particles of which are smaller than the crystals of the glutamate.

4. As a new product, crystals of monosodium glutamate coated with a finely powdered carboxymethyl ether of a native, high molecular weight, microbiologically produced dextran containing an average of 2.0 to 3.0 carboxymethyl groups per anhydroglucopyranosidic unit, the particles of the powdered ether being smaller than the crystals of the glutamate.

5. The method of protecting crystals of monosodium glutamate against loss of flavor-enhancing potency and preventing agglomeration of the crystals which comprises commingling the crystals with a carboxymethyl ether of a dextran having a molecular weight between 5000 and that of native microbiologically produced dextran to provide the crystals with a protective coating of the dextran ether.

6. The method of protecting crystals of monosodium glutamate against loss of flavor-enhancing potency and preventing agglomeration of the crystals which comprises commingling the crystals with a finely powdered carboxymethyl ether of a dextran having a molecular weight between 5000 and that of native microbiologically produced dextran and the particles of which are smaller than the glutamate crystals to provide the crystals with a protective coating of the dextran ether.

7. The method of protecting crystals of monosodium glutamate against loss of flavor-enhancing potency and preventing agglomeration of the crystals which comprises intimately commingling the crystals with a finely powdered carboxymethyl ether of a native, high molecular weight, microbiologically produced dextran containing an average of 2.0 to 3.0 carboxymethyl groups per anhydroglucopyranosidic unit to thereby provide the crystals with a protective coating of the ether.

8. The method of protecting crystals of monosodium glutamate against loss of flavor-enhancing potency and preventing agglomeration of the crystals which comprises intimately commingling the crystals with a finely powdered carboxymethyl ether of a native, high molecular weight, microbiologically produced dextran the particles of which are smaller than the glutamate crystals, containing an average of 2.0 to 3.0 carboxymethyl groups per anhydroglucopyranosidic unit to thereby provide the crystals with a protective coating of the ether.

References Cited in the file of this patent

UNITED STATES PATENTS

| | | |
|---|---|---|
| 2,089,217 | Mahoney | Aug. 10, 1937 |
| 2,270,582 | Esselen | Jan. 20, 1942 |
| 2,609,368 | Gaver | Sept. 2, 1952 |
| 2,665,988 | Searle | Jan. 12, 1954 |